United States Patent [19]

Novak et al.

[11] 3,979,244

[45] Sept. 7, 1976

[54] RESIN BONDED COMPOSITE ARTICLES AND PROCESS FOR FABRICATION THEREOF

[75] Inventors: Richard Charles Novak, Glastonbury; Roscoe Adams Pike, Simsbury, both of Conn.

[73] Assignee: United Technologies Corporation, Hartford, Conn.

[22] Filed: June 2, 1975

[21] Appl. No.: 583,129

Related U.S. Application Data

[62] Division of Ser. No. 446,890, Feb. 28, 1974, Pat. No. 3,915,781.

[52] U.S. Cl. .......................... 156/179; 29/156.8 B; 156/298; 156/302; 427/34; 428/389
[51] Int. Cl.$^2$ ............................................ B32B 31/20
[58] Field of Search ........... 156/179, 178, 177, 176, 156/307, 245, 204, 300, 302, 303, 298, 145; 427/34; 79/419, DIG. 1, DIG. 39; 29/156.8 B, 156.8 P; 416/229, 230, 241; 428/75, 251, 256, 344, 389

[56] References Cited
UNITED STATES PATENTS

| | | | |
|---|---|---|---|
| 3,606,667 | 9/1971 | Kreider | 427/34 |
| 3,609,855 | 10/1971 | Schmidt | 29/419 |
| 3,779,851 | 12/1973 | Hartz | 156/309 |
| 3,798,105 | 3/1974 | Hannah et al. | 156/309 |
| 3,886,647 | 1/1975 | Alexander | 416/230 |

*Primary Examiner*—Douglas J. Drummond
*Assistant Examiner*—Michael W. Ball
*Attorney, Agent, or Firm*—Robert C. Walker

[57] ABSTRACT

A preconsolidated tape of continuous, high strength filaments in a metal matrix is coated with a layer of adhesive polymer and cut into shaped plies. The coated plies are stacked in a mold and resin bonded together by the application of heat and pressure. Many of the desirable physical properties of a diffusion bonded metal matrix article are also found in the resin bonded metal matrix article of the subject invention. Also, the use of preconsolidated adhesive coated plies eliminates the need for high diffusion bonding pressures and temperatures, thereby cutting the time involved for the bonding and molding operation by a factor of 8 in some instances.

3 Claims, No Drawings

RESIN BONDED COMPOSITE ARTICLES AND PROCESS FOR FABRICATION THEREOF

This is a division, of application Ser. No. 446,890, filed Feb. 28, 1974, now U.S. Pat. No. 3,915,781.

BACKGROUND OF THE INVENTION

1. Field of the Invention

This invention relates to filament reinforced composite articles.

2. Description of the Prior Art

The use of metal matrix filament reinforced composite tapes for the manufacturer of composite articles is well known in the art. For example, boron/aluminum and silicon carbide coated boron/aluminum composites are receiving widespread interest in the aerospace industry because of their excellent mechanical properties and low weight. These boron/aluminum composites offer a number of advantages over the well known boron filament/resin matrix composites in view of their isotropy of elastic and strength properties. Consequently, in many structural applications where multi-directional loads are present, boron/aluminum can offer advantages over resin matrix composites. However, a series disadvantage of prior art filament/metal matrix fabrication techniques is that the final molding operation may take four hours or more. The reason for this is that the metal matrix material is consolidated within the die at the final molding operation and/or the individual plies are diffusion bonded together during the final molding operation. In either event pressures on the order of several thousand pounds per square inch and temperatures on the order of about 800°F and higher are required for optimum diffusion bonding of the plies and consolidation of the metal matrix. The equipment required for this process is expensive particularly in view of the high pressures required; furthermore, this equipment is not readily available to smaller manufacturing firms and is frequently impractical for fabricating large articles. These considerations and the fact that the bonding operation for each part requires several hours reduces the cost effectiveness of the material making it impractical to use for many applications. On the other hand, filament reinforced resin matrix composites can be consolidated at relatively low temperatures and pressures.

U.S. Pat. No. 3,606,667 to Kreider describes one technique for making unconsolidated filament reinforced metal matrix tapes and also discusses simultaneously diffusion bonding and consolidating several layers of these tapes at high pressures and temperatures to form a composite article. Kreider et al U.S. Pat. 3,615,277 also describes a process for fabricating an unconsolidated filament reinforced metal matrix tape, a plurality of these tapes being braze bonded to each other and consolidated at low pressures but at diffusion bonding temperatures.

SUMMARY OF THE INVENTION

Accordingly, an object of the present invention is a process for fabricating high strength, high modulus filament/metal matrix composite articles using conventional, low cost techniques while maintaining many of the desirable physical properties of the conventionally fabricated filament/metal matrix composite articles.

Another object of the present invention is a method for fabricating a high strength, high modulus filament/metal matrix tape, plies of which may be stacked directly into a mold without further preparation and formed into a composite article using the low pressures and temperatures generally associated with bonding resin matrix composites.

A further object of the present invention is a composite article having many of the desirable physical properties of a diffusion bonded filament reinforced/metal matrix article but which is fabricated at pressures and temperatures well below conventional diffusion bonding pressures and temperatures.

In accordance with one aspect of the present invention a composite article is fabricated from tapes of fully consolidated high modulus, high strength filaments in a fully densified metal matrix material by applying a layer of adhesive polymer to plies of the tape and resin bonding the plies together using relatively low pressures and temperatures.

Since the plies are resin bonded together, pressures and temperatures comparable to those used when fabricating filament reinforced resin matrix composites may be used in the process of the present invention. It has been found that many of the desirable physical properties of a diffusion bonded metal matrix system are retained in the resin bonded metal matrix system. Thus, some of the best of both worlds is obtained by the process and article of the present invention.

A further advantage of the present invention is that its usefulness is not limited to any specific filament/metal matrix composite material. The adhesive polymer used to bond the plies together may be chosen to suit the needs of the manufacturer of the article and would in most cases be chosen simply on the basis of the conditions under which the finished article is to be used. For example, if a boron filament/aluminum matrix material is used the adhesive may be a high temperature polyimide, given the composite essentially the same high temperature capability as a diffusion bonded boron/aluminum composite; or it may be an epoxy or a thermoplastic material having lower temperature capability. This new tape material should also permit the fabrication of large parts by a simple vacuum bag technique.

In contrast, the composite tape described by Kreider et al in forementioned U.S. Pat. No. 3,615,277 requires special brazing metal foil layers and a special plasma sprayed brazable metal layer. The foil layer must have "a melting point lower than that at which fiber degradation occurs and below that of the plasma sprayed metal layer." With this type of tape material Kreider et al is able to avoid high bonding pressures since he is able to braze bond the plies together; however, bonding temperatures are still as high as conventional diffusion bonding temperatures and consolidation of the metal matrix material is still done during the final bonding operation. A further disadvantage of the Kreider et al composite tape and the process used to form a composite article therefrom is that during the bonding operation temperatures "must be carefully controlled to avoid excessive melting of the [metal matrix material] and resulting uneven fiber spacing in the final product." Since composite tapes of the subject invention are fully consolidated prior to the bonding the molding operation, and because low temperatures as well as low pressures are used, there are no such problems as there are with Kreider et al.

Another feature of the present invention is that the time involved for the final article molding operation may be on the order of only one-half hour including heat up and cool down time. On the other hand, the composite metal matrix tapes and processes of the prior art may require the manufacturer of the final article to spend on the order of four hours or more on the final molding operation.

The foregoing and other objects, features and advantages of the present invention will become more apparent in the light of the following detailed description of preferred embodiments thereof.

BRIEF DESCRIPTION OF THE PREFERRED EMBODIMENT

In an exemplary embodiment of the present invention the first step is the fabrication of a high strength, high modulus filament reinforced metal matrix tape of controlled filament spacing. One method for making such a tape is described in Kreider U.S. Pat. No. 3,606,667 and in Kreider U.S. Pat. No. 3,575,783 both of which are incorporated herein by reference. Briefly, the filament spacing is determined by winding the high strength, high modulus filaments onto a metallic foil wrapped mandrel using a modified engine lathe with a screw thread auger. Filament spacing is chosen on the basis of filament diameter, foil thickness and final volume fraction of filament desired; and the filaments are wound so that when the tape is removed from the mandrel it will have the filaments aligned along its tensile axis. Also, the tape will comprise filaments which are continuous from one end of the tape to the other. A plasma spray operation follows filament winding. This operation provides additional metal matrix material, especially in the gaps between filaments, and also produces a preliminary filament to foil bond which permits the tape to be handled easily. This plasma spray layer is deposited by simulaneously rotating and traversing the filament wrapped mandrel in front of a plasma spray arc. The metal matrix powder is injected into the hot gas of the arc and is melted and impacted onto the tape where it is rapidly solidified forming a bond between the filaments and between the foil and filaments. During this plasma spray process the mandrel is spring loaded to allow for the thermal expansion mismatch between the foil substrate and the filament. This entire process may or may not have to be performed in a vacuum or in an atmosphere of inert gas depending upon the filament material being used. For example, if boron filaments coated with silicon carbide are used the plasma spraying can be performed in air. Although plasma spraying is the preferred method for making up unconsolidated tapes, such tapes may be made by an suitable technique such as molten metal infiltration, vapor deposition, electrodeposition and eutectic solidification, all of which are well known to those with ordinary skill in the art. The unconsolidated tape, at this stage designated a preform, is then removed from the mandrel in this exemplary embodiment; but, however made, it is now ready for the next step: consolidation.

Consolidation, which is simply the step of fully densifying the metal matrix material by bonding all the metal matrix particles together and eliminating voids, is accomplished in this exemplary embodiment by hot press diffusion bonding. This may involve, for example, moving the tape preforms by steps between preheated hot press platens along with an additional layer of metal foil placed over the plasma spray tape side. The platens are closed upon each section of tape immediately upon entry of that tape section into the hot zone and pressure is applied. This quick application of pressure causes closure of the plasma spray layer around the filaments, excluding the surrounding air from the filament surface and preventing filament degradation. Temperatures and pressures used in the consolidating step vary with matrix composition and filament type. Consideration of full composite consolidation and filament degradation determine final conditions. For example, tapes having a matrix material of 6061 aluminum alloy (1.0% Mg, 0.5% Si, balance Al) or 2024 aluminum alloy (4.5% Cu, balance Al) are hot pressed within 86°F of the alloy solidus while tapes having a matrix material of 1100 commercially pure aluminum are fabricated at a lower homologous temperature.

Tapes made by the foregoing process are fully consolidated and well bonded. The filament spacing is preserved and the tape is well balanced with the filaments located approximately at the tape mid line. The consolidated tape surface condition is smooth and impermeable and can be prepared by various cleaning procedures, common to the particular metal matrix material, for further bonding operations.

Fully consolidated monolayer tapes suitable for the next steps, application of an adhesive polymer and forming composite articles according to the present invention, have been made using 5.6 mil diameter boron filaments in 6061, 2024 and 1100 aluminum matrices with volume fractions of filaments of up to 60%. Similar tapes using 5.6 mil diameter boron filaments having a 0.05 mil thick coating of silicon carbide have also been successfully produced.

The next step according to the present invention is to coat the consolidated tape with an adhesive polymer. The choice of an adhesive polymer will depend largely upon the structural and temperature requirements of the finished composite article. In order to assure a reliable high quality bond, the first step in the adhesive coating process is a thorough cleaning of the surface to be coated. Cleaning removes dirt and moisture thereby promoting adhesion of the adhesive to the tape surface. Several cleaning methods are possible ranging from a simple wire brushing to a complicated chemical etching procedure. Etching may not be particularly desirable for some filament materials, such as boron, because of the possiblity of chemical attach thereto. Any one signal cleaning step, such as wire brushing, may not be adequate under some circumstances and therefore a combination of cleaning steps may be required. A procedure preferred for cleaning the surface of tapes of boron filaments in an aluminum matrix material involves the steps of wire brushing, solvent rinse, sand blasting, and a final solvent rinse. The adhesive layer must be applied before dirt and moisture have a chance to reaccumulate on the cleaned surface. Therefore it is preferable to put the adhesive layer on the tape immediately after the tape is cleaned.

The adhesive layer may be applied by any one of a number of techniques such as by spraying, dip coating, or metering on with padded rollers. Successful results have been obtained in the laboratory simply by applying the adhesive layer with a small paint brush. Some elevated temperature epoxy adhesive systems may require the additional step of b-staging the adhesive layer in order to drive off most of the solvent and to partially cure the resin to control flow of resin and minimize void content during the final bonding step. Although it is preferred that both sides of the tape be coated with adhesive to insure clean bonding surfaces, the invention also contemplates that only one side may be coated.

The final steps in the process of fabricating a composite article according to the teachings of the present invention include cutting the adhesive coated tapes into plies, stacking the plies in a mold of any desired shape, and resin bonding the plies together and forming them into the shape of the mold using, for example, conventional compression molding techniques. Depending upon the size of the composite article being made and the adhesive polymer layer employed, autoclave, vacuum bag or vacuum bagging with augmented pressures may, in some instances, offer certain advantages over compression molding. In the claims, the step of bonding the plies together and forming them to the shape of the mold is intended to encompass all of the foregoing techniques as well as other conventional techniques not mentioned, but which, to one with ordinary skill in the art, would be obvious to use.

Table I sets forth various mechanical properties of a composite article made according to the process of the present invention using silicon carbide coated boron (BORSIC) filaments in a 6061 aluminum matrix, the fully consolidated tape being coated with an unsupported layer of Dupont's NR-150C which is a film forming thermoplastic polyimide hot melt adhesive. More specifically, NR-150C is a dimethylformamide solution of polyamic acid. The bonding/molding temperatures and pressures for this tape system were about 770°F and 1000 psi. Temperature and pressure was held for about 7 minutes. A tape coated with the foregoing adhesive may be stored for long periods of time without deterioration of adhesive properties, and is particularly advantageous for that reason.

TABLE I

MECHANICAL PROPERTIES OF UNIDIRECTIONAL BORSIC-6061 ALUMINUM/NR-150C POLYIMIDE COMPOSITES

| Property | Volume % Filaments | Temperature (°F) | Value (psi) |
|---|---|---|---|
| Short Beam | | 70 | $12.6 \times 10^3$ |
| Shear Strength | 43 | 500 | $6.7 \times 10^3$ |
| | | 600 | $4.5 \times 10^3$ |
| Flexural Strength | 43 | 70 | $230.0 \times 10^3$ |
| Flexural Modulus | 43 | 70 | $27.0 \times 10^6$ |

Table II sets forth various mechanical properties of composites fabricated according to the present invention using uncoated boron filaments in a 6061 aluminum matrix material, the fully consolidated tapes being coated with an adhesive layer of 3M Company's PR-286 epoxy (a liquid resin). Bonding/molding temperatures and pressures for this tape system were about 350°F and 50 psi. The pressure and temperature was held for about 120 minutes. The following additional polyimide film hot melt adhesives were tested successfully: Dupont's NR-150B and Upjohn's 2080.

TABLE II

MECHANICAL PROPERTIES OF UNIDIRECTIONAL BORON-6061 ALUMINUM/PR-286 EPOXY COMPOSITES

| Property | Volume % Filaments | Temperature (°F) | Value |
|---|---|---|---|
| Short Beam | | 70 | $11.4 \times 10^3$ psi |
| Shear Strength | 39 | 350 | $4.6 \times 10^3$ psi |
| Shear Modulus Longitudinal | 43 | 70 | $4.19 \times 10^6$ psi |
| Tensile Strength Longitudinal | 43 | 70 | $167.0 \times 10^3$ psi |
| Tensile Modulus Longitudinal | 43 | 70 | $29.4 \times 10^6$ psi |
| Failure Strain Transverse | 43 | 70 | 0.66% |
| Tensile Strength Transverse | 42 | 70 | $20.9 \times 10^3$ psi |
| Tensile Modulus Transverse | 42 | 70 | $14.2 \times 10^6$ psi |
| Tensile Failure | 42 | 70 | 0.18% |

Table III sets forth various mechanical properties of composite articles made according to the process of the present invention and comprising uncoated boron filaments in a 6061 aluminum matrix material, the fully consolidated tapes being coated with an adhesive layer of Shell Chemical Company's Epon 828-DETA epoxy which is a liquid resin. Bonding/molding temperatures and pressures for this tape system were 72°F and 50 psi for about 10 minutes. The pressure may then be removed and the article allowed to cure at room temperature.

TABLE III

MECHANICAL PROPERTIES OF UNIDIRECTIONAL BORON 6061 ALUMINUM/EPON 828-DETA EPOXY COMPOSITES

| Property | Volume % Filaments | Temperature (°F) | Value |
|---|---|---|---|
| Short Beam Shear Strength Longitudinal | 46 | 70 | $10.8 \times 10^3$ psi |
| Tensile Strength Longitudinal | 46 | 70 | $170.0 \times 10^3$ psi |
| Tensile Strength Longitudinal | 46 | 70 | $32.2 \times 10^6$ psi |
| Tensile Failure Strain Transverse | 46 | 70 | 0.63% |
| Tensile Strength Transverse | 37 | 70 | $19.9 \times 10^3$ psi |

TABLE III-continued
MECHANICAL PROPERTIES OF UNIDIRECTIONAL BORON 6061 ALUMINUM/EPON 828-DETA EPOXY COMPOSITES

| Property | Volume % Filaments | Temperature (°F) | Value |
|---|---|---|---|
| Tensile Modulus Transverse | 37 | 70 | $14.3 \times 10^6$ psi |
| Tensile Failure Strain | 37 | 70 | 0.32% |

The foregoing are only examples of composite tape systems successfully fabricated according to the present invention. The invention is not intended to be limited to these examples. While composite tape of coated and uncoated boron filaments in an aluminum or aluminum alloy matrix is preferred, the subject invention is obviously suited for use with any coated or uncoated high strength, high modulus filament in a compatible metal matrix material. Similarly, the adhesive polymer used in the process of the present invention need not be limited to those specific compositions set forth in the foregoing examples. The adhesive polymer may be a liquid resin (as in the examples of Tables II and III), an unsupported film of thermoplastic resin (as in the example of Table I), a supported film of thermoset or thermoplastic resin (such as 3M Company's AF-111 which is a thermoset epoxy adhesive supported on a nylon fabric), or any other adhesive polymer which bonds well to the particular matrix material of the consolidated tape, the choice being largely dependent upon the strength and temperature requirements of the composite article being fabricated.

Furthermore, the pressures, temperatures, and times used during the bonding/molding step of the present invention may be anywhere from 14.7 to 2,000 psi, room temperature to 800°F and 1.0 to 120 minutes, respectively, depending upon the adhesive polymer being used to bond the plies together. In any event, these pressure and temperature ranges are all well below the ranges required to obtain optimum physical properties in a composite article manufactured by conventional diffusion bonding techniques.

It has also been found that an elastomeric resin laminating binder, although not an adhesive polymer, may also be used to bond preconsolidated plies of silicon carbide coated boron filaments in an aluminum matrix. The desired flexural and shear modulus may be obtained by choice of resin, bond line thickness, and ply thickness. Composite articles with very high axial strength to density, very high axial modulus to density and with very little shear modulus have been successfully fabricated. This material would appear to be well suited for use as a torsional hinge which is loaded in tension such as for the hub connections for hingeless helicopter rotor blades described in copending, commonly assigned patent application Ser. No. 132,459, Helicopter Rotor System to Arcidiacono filed on Apr. 8, 1971.

As heretofore mentioned, with the use of certain adhesives the bonding/molding operation of the present invention may take only one-half hour including heat up and cool down time, while a composite article made from tapes of the same basic material but which are diffusion bonded together may require four hours for the bonding step.

These foregoing advantages are best enjoyed by the manufacturer of the final product: the composite article. It is contemplated that the manufacturer will purchase preconsolidated tapes which have already been coated with an adhesive. The manufacturer need only cut the tapes into a plurality of shaped plies and to bond and mold them together, without further preparation, using very conventional equipment and techniques. In the past the manufacturer has been required to both consolidate and diffusion bond the metal matrix plies together, necessitating expensive and complex machinery and excessive lengths of time. Although it is preferred that the manufacturer be sold tapes with the adhesive already applied, it is apparent that he could easily apply the adhesive either to the as-received preconsolidated tapes or to the plies after they are cut.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A process for manufacturing a composite monolayer tape material of high strength, high modulus filaments in a metal matrix for use in the fabrication of a multilayer tape, composite article comprising the steps of:
   positioning a plurality of high strength, high modulus reinforcing filaments parallel to each other and substantially uniformly spaced apart on a layer of metal foil, said filaments being aligned along the tensile axis of the tape material;
   depositing a plasma spray layer of metal matrix material over said filaments to bond the filaments to the metal foil layer and to each other;
   positioning an additional metal foil layer over the filaments and plasma sprayed matrix material;
   consolidating the combination of foil layers, filaments, and plasma sprayed matrix material by the application of heat and pressure thereto until the matrix material is fully densified thus forming a consolidated, monolayer tape;
   cleaning at least one side of said consolidated tape; and
   applying a layer of adhesive polymer immediately after said step of cleaning to a cleaned side of said tape, the adhesive polymer being selected from the group consisting of a liquid resin, an unsupported layer of thermoplastic resin, a thermoplastic resin supported in a medium of fibrous material, and thermosetting resin supported in a medium of fibrous material.

2. The process according to claim 1 wherein the filaments are selected from the group consisting of boron filaments and boron filaments coated with silicon carbide, and the foil material is selected from the group consisting of aluminum and alloys of aluminum.

3. The process according to claim 2 wherein the adhesive polymer is a film forming thermoplastic high temperature polyimide melt adhesive having the characteristic that its adhesive properties do not deteriorate with time upon exposure to air such that the tape has a long shelf life.

* * * * *